No. 621,794. Patented Mar. 28, 1899.
I. W. COLBURN.
GLASS WORKING MACHINE.
(Application filed Feb. 18, 1898.)

(No Model.) 4 Sheets—Sheet 1.

Fig. 1.

WITNESSES.
J. M. Fowler Jr
Walter B. Payne.

INVENTOR.
Irving W. Colburn
by Henry H. Bates
his attorney.

THE NORRIS PETERS CO., PHOTO-LITHO., WASHINGTON, D. C.

No. 621,794. Patented Mar. 28, 1899.
I. W. COLBURN.
GLASS WORKING MACHINE.
(Application filed Feb. 18, 1898.)

(No Model.) 4 Sheets—Sheet 2.

WITNESSES.
J. M. Fowler Jr.
Walter D. Payne.

INVENTOR.
Irving W. Colburn
by Henry H. Bates,
his Attorney.

No. 621,794. Patented Mar. 28, 1899.
I. W. COLBURN.
GLASS WORKING MACHINE.
(Application filed Feb. 18, 1898.)
(No Model.) 4 Sheets—Sheet 3.

Witnesses:
J. M. Fowler Jr.
Walter P. Payne.

Inventor:
Irving W. Colburn
by Henry A. C. Bates
his Attorney.

UNITED STATES PATENT OFFICE.

IRVING W. COLBURN, OF TOLEDO, OHIO.

GLASS-WORKING MACHINE.

SPECIFICATION forming part of Letters Patent No. 621,794, dated March 28, 1899.

Application filed February 18, 1898. Serial No. 670,825. (No model.)

*To all whom it may concern:*

Be it known that I, IRVING W. COLBURN, a citizen of the United States, residing at Toledo, in the county of Lucas and State of Ohio, have invented certain new and useful Improvements in Glass-Working Machines; and I do hereby declare the following to be a full, clear, and exact description of the invention, such as will enable others skilled in the art to which it appertains to make and use the same.

My invention relates to a novel means or apparatus for carrying into operation a new mechanical method of forming and manufacturing articles of glass such as have heretofore been made by blowing, in connection with sectional molds, either purely by manual process or in conjunction with machinery. By my present method I dispense with molds and form the article by means of rolls or moving formers the surfaces of which move in contact with the plastic glass, and thus model, shape, and form the article while cooling. The plastic glass while in contact with these formers may be rotated on its axis, either in the same direction in which the formers are moving or in the opposite direction, with similar or different speeds, and the formers may either be positively rotated or allowed to rotate by frictional contact with the rotating mass of glass, or the glass itself may be held stationary, in which case the formers must be revolved about the glass in addition to having a rotatory motion on their own axes. In the accompanying drawings the surfaces of the glass and the formers, where the two would come in contact, would by the arrangement of gearing shown be traveling in the same direction. In conjunction with these formers I commonly employ a gathering-iron, preferably made tubular, to serve as a blow-iron or blowpipe in the usual form, the glass being gathered, as heretofore, on the end of the gathering-iron and expanded by air sent under pressure through said tubular iron or by centrifugal force generated by the revolution of said iron, or by both in conjunction, the exterior walls of the article being at the same time shaped, modeled, or fashioned by contact with the above-mentioned revolving rolls or formers of the proper configuration to give the requisite shape to the article, the entire operation being carried on by machinery presently to be described, so that highly-skilled manual labor is dispensed with, only sufficient skill being required to place and remove the blow-irons, to previously gather and slightly manipulate the amount of glass requisite to form the article being manufactured, and to start the machine.

The object of the herein-described invention is to produce articles of glass such as have hitherto been made by molding, in conjunction with blowing, by the application of a new principle and mode of operation in this art—to wit, the modeling and shaping of the article by rolling or moving pressure in distinction from the static pressure of the mold. By this means all possibility of a fin is avoided, striæ and wrinkles on the surfaces due to contraction in contact with a chilling-surface are obviated, being ironed out under the moving contact-surfaces, the glass is homogeneously kneaded and compressed throughout its mass as it cools, thus obviating strains, and larger articles than hitherto produced in molds by machinery can successfully be essayed, since the drag or friction in the mold during contraction in cooling, causing striæ and twisting strains, and cleavage-lines along which fracture occurs under the old method, are obviated. I can attempt articles of any size such as have hitherto required highly-skilled manual labor for their production. Objects of various shapes other than cylindrical may also be produced, as shown in the accompanying drawings, by means of formers of modified shape, and any ornamentation or lettering, either raised or depressed, may be impressed upon the same with a sharpness comparable to that of articles made in static molds under the repeated impressions made by the revolving formers upon the plastic and cooling glass. All this is done with one heating of glass and by automatic machinery, the only skill required being sufficient to gather a proper amount of glass on the gathering-iron, properly manipulate the same to give it the initial form, slightly expand the mass by blowing, place the iron in its seat, and start the machine.

In the drawings forming a part of this specification, Fig. 5 is a front elevation of the electric rheostat for starting, stopping, and controlling the electric motor from which power is derived, radius-arm in the position assumed when the current is entirely cut off. Fig. 6 is a front elevation of details of the controlling-lever of the rheostat, partly in section, showing the position of the parts before the current is turned on. Fig. 7 is a view, partly in section, of the said controlling-lever details, taken at right angles to Fig. 6. Fig. 8 is a plan view of one form of a retarder (air-dash pot) for retarding the operation of the starting mechanism with bracket-arm. Fig. 9 is a view in vertical section of the same retarder. Fig. 10 is a vertical sectional view of the air-valve for automatically regulating and controlling the amount of air admitted to the blowpipe. Fig. 11 is a horizontal section of the same air-valve, taken on line 11' 11', Fig. 10. Fig. 12 is a horizontal section of the same air-valve, taken on line 12' 12', Fig. 10. Fig. 13 is a side elevation, partly in section, of the extreme end of the overhanging arm of the frame which sustains the blow-iron and means for revolving the same and supplying air. Fig. 14 is a view of same, taken at right angles to Fig. 13. Fig. 15 is a sectional view of a former with operating-gear. Fig. 16 is a view of same, taken at right angles to Fig. 15.

Referring to the drawings, $a$ represents the base of the machine, cored for lightness and mounted for portability and convenience of moving on truck-wheels E F F', wheel E being swiveled, as at D. Upon said base $a$ is mounted the upright main standard A, having overhanging arm B, which supports the vertical hollow shaft or air-spindle $s$, from which the blow-iron derives rotary motion, and a supply of air, together with means for imparting such rotary motion, (gears $v$ $v'$ $v''$ $v'''$ and shaft 30,) means for elevating and depressing said air-spindle, (levers $q$ $q'$, collar $r$,) and means for supplying air to said blow-iron through said air-spindle, (pipes $w$ $w'$ $w''$, air-chamber 29.)

C is the terminus of overhanging arm B, containing air-box 29 and rotary shaft or air-spindle $s$.

$s'$ is a clutch on the lower end of air-spindle $s$, of ordinary construction, for retaining and rotating the blow-iron, through which clutch the air is transmitted.

$t$ is the blow-iron, supported in upright position by arms $m$ $m'$, sustained on the main standard A. It has the usual enlargement $t'$ for supporting the iron in its seat on arm $m'$.

Motive power for actuating the several movements, including the automatic regulation of the supply of air, &c., is furnished from any convenient source, but preferably from an electric motor, which is represented by I, standing on a bracket-arm 45. This motor transmits its power through the worm J on shaft 34 and worm-gear K to main shaft $x$, from which is transmitted all the movements required in the operation of the machine. Main standard A is recessed at 35 to accommodate gear K. At the top of the machine, as before stated, are located the bevel-gears $v$ $v'$ $v''$ $v'''$ and shaft 30 for transmitting rotary motion to the air-spindle $s$. In like manner provision is made for imparting rotary motion to the forming-rolls through bevel-gears $y$ $y'$ $y''$ $y'''$, shafts H and $e$, and gears $i$ $j$ $j$ $j$. I preferably make the above-named series of gears on shafts H, $e$, $x$, 30, and $s$ removable and interchangeable, so as to provide for differential rates of speed and for similar rates of speed when occasion requires between the surfaces of the rotating formers and that of the revolving mass of plastic glass, the said shafts and their bearings being made practically adaptable to such changes in a well-known way.

Returning now to the base of the machine, $b$ is a tank or receptacle for water formed in base $a$, having a central boss or hub $c$ for sustaining the mechanism of the rolls. Said tank is for the purpose of wetting and cooling the rolls or formers after each operation of forming an article, said rolls being arranged so as to be automatically dipped for the purpose at the close of the cycle of operation.

Figure 1:
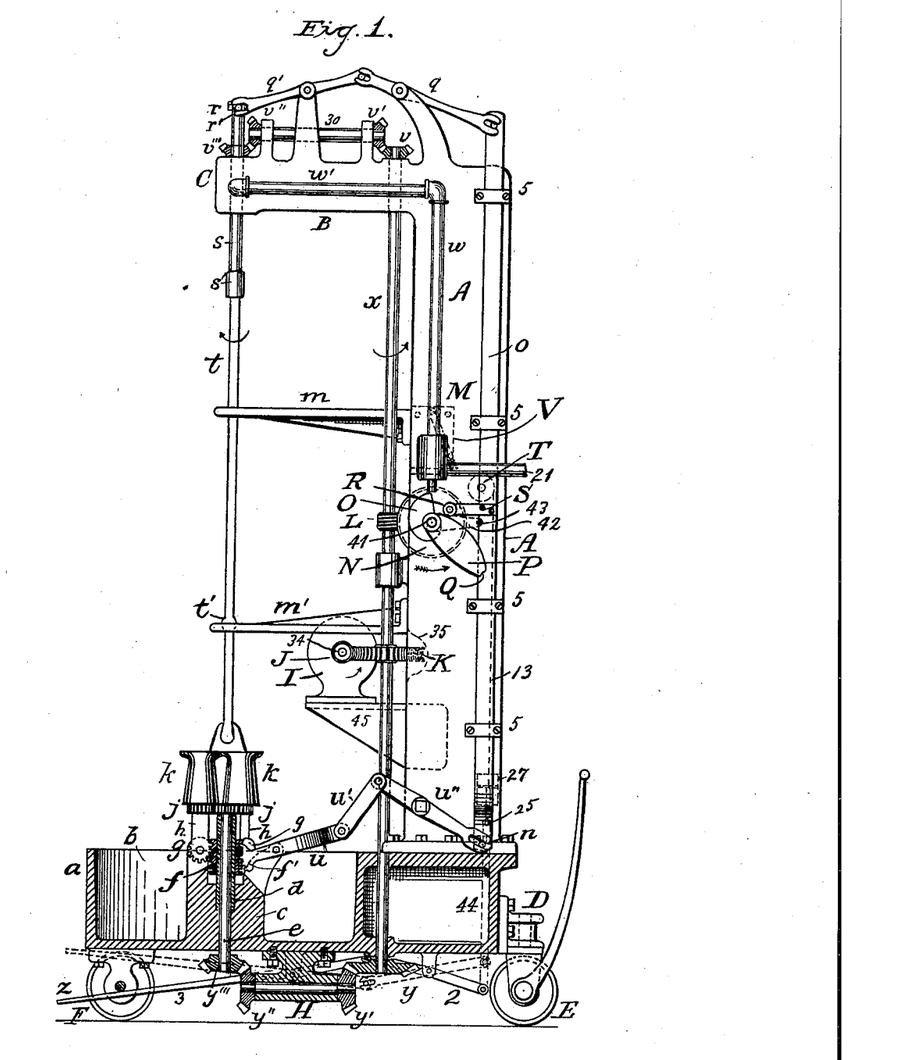
Figure 1 is a side elevation, partly in section, showing my apparatus at a midway stage of the operation with blow-iron in position, a gathering of glass attached and manipulated, rolls upright and closed around the glass the shaping of which has just been completed, air-blast just shut off, and lifting-cam in position to enter upon the series of operations which releases the blow-iron and separates the rolls prior to the automatic stoppage of the movements of the mechanism, permitting the removal of the blow-iron and the article attached.
Figure 2:
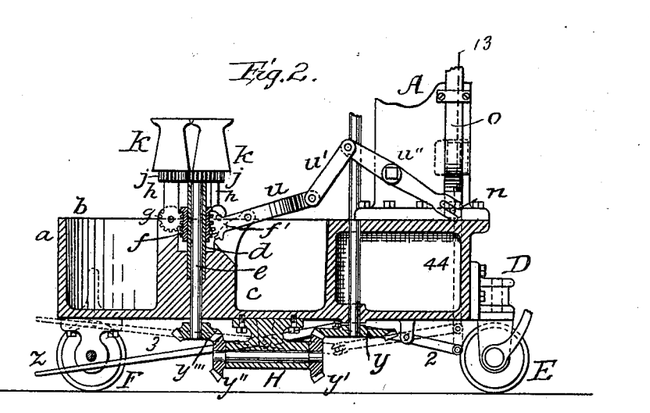
Fig. 2 is a side elevation, partly in section, of the lower part of the apparatus at a stage of operation similar to that of Fig. 1.
Figures 3, 18:
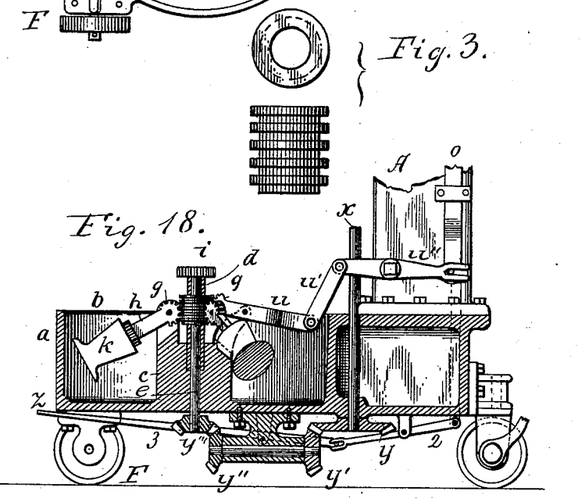
Fig. 3 is the cylindrical rack, side and plan view.
Fig. 18 is a vertical sectional view of the base of the machine, corresponding to Fig. 17.

$k$ $k$ are the rolls or formers, two or more, made of any suitable material and contour and so as to be paste-covered when desired, according to the nature, size, and shape of the articles to be produced. These formers are mounted in a symmetrical group on shafts $h$ $h$, pivoted in boss $c$, so as to swing outward and downward radially, said shafts $h$ being provided at their lower extremities with toothed sectors $g$ $g$, meshing with a cylindrical rack $f$. Said cylindrical rack is mounted sleeve-fashion upon the upright shaft $e$, a sleeve $d$ being preferably interposed between the rack and the said upright shaft to prevent water from gaining access to the rotary shaft. Upon the top of said rotary upright shaft $e$ is borne a pinion $i$, and on each of the arms $h$ $h$ is borne a loose pinion $j$, rotatable on shaft 31, and each carrying and having attached to it a rotatable former $k$. Said formers $k$, with their pinions $j$, are interchangeable and are detachably carried on the arms $h$, so as to revolve freely on shaft 31, where they are retained by any well-known means, as nut 33. The cylindrical rack $f$ plays up and down as actuated by means presently to be described, thereby controlling the position of the rolls or formers $k$. When said rack is in its lowermost position, the arms $h$ $h$ stand vertically, as shown in Fig. 1, and the loose pinions $j$ $j$ intermesh with the pinion $i$, borne on shaft $e$, receiving rotary motion therefrom, which is thus imparted to each of the formers. In case it is desired to have a portion of the formers revolve in opposite directions to the remaining formers of the group this may be effected by intermediate pinions suitably placed or in any convenient way well-known to the mechanic arts. When the rolls or formers are to receive motion from the rotating glass, the pinion $i$ is removed.

Figure 4:
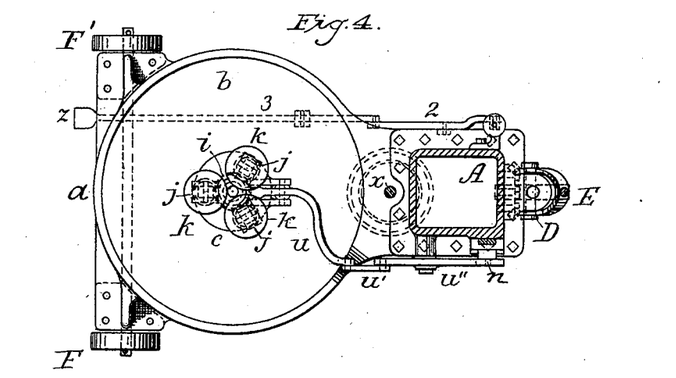
Fig. 4 is a plan view of the base of the machine, parts in the same position as in Fig. 2.

The cylindrical rack $f$ receives its movement of reciprocation through a toothed sector or circular rack $f'$ and the system of connected levers $u$ $u'$ $u''$, connecting with the upright reciprocating bar $o$, presently to be described. Member $u$ of the system is curved, as shown in Fig. 4, to carry the movement from the side of the machine to the center of the tank, where the rack $f$ is located.

In the drawings I have shown a symmetrical group of three rolls or formers; but it is obvious that any number from two upward may be employed, according to the nature and dimensions of the object to be manufactured.

Upright bar $o$ is held securely in boxes or ways 5, so as to freely reciprocate therein, as automatically controlled by the operation of the machine presently to be described. At the top of the machine a system of levers $q$ $q'$ convey reciprocating linear motion from said bar $o$ to the air-spindle $s$, said spindle being splined so as to reciprocate freely through gear $v'''$ without interfering with the rotary motion derived from the latter. Said spindle $s$ is perforated at 30, where it passes through air-box 29 in order to take air freely while under rotation, the perforations being at such intervals as to take air at any position of the said vertical shaft or spindle. It is also flanged at the top and provided with a collar $r$ underneath the flange, said collar having trunnions $r'$, with which the forks of lever $q'$ engage in order to elevate and depress the rotating spindle. The bar $o$ is heavy enough to insure its descent at the proper time against the resistance of the various parts actuated by such movement, or it may be additionally weighted, if necessary. A retarder 4, having piston 26, is provided to prevent the too sudden application of the starting mechanism through the treadle $z$, which otherwise would shock and strain the machinery and burn out the armature of the motor. The form of retarder shown in the drawings is an air-dashpot; but any other retarder of equivalent function will answer—as, for instance, a friction-brake or wind-wheel with ratcheted connection to prevent retarding except in one direction only or a rotary oil-dash pot with similar provision. In order to provide for a proper leakage of air to give function to the dash-pot shown, the piston should have sufficient play to allow some air to pass, or a passage 28 may be provided, either in the piston or elsewhere, which may be made regulable as to size of aperture. A valve 27 is also provided at some convenient point, so that the resistance of the air shall not impede the upward movement of the piston when cam-lever 42 and striker 43 suddenly swing the radius-arm 6 of the rheostat M to the left in cutting off the current for stopping the machine, said radius-arm being connected to the piston 26 by cord or chain 13, passing over pulley T. Said piston has a stem 25 protruding through an aperture in the base of the dash-pot, which is suitably connected with the extremity of treadle-lever 2.

V represents an air-valve for automatically regulating the amount or quantity of air admitted to the blow-iron. This valve has functions similar to those of a needle-valve, and the form I have illustrated is sufficiently delicate for the purpose. Said valve, Figs. 10, 11, and 12, consists of a chamber with longitudinal recesses 46 formed in its walls between longitudinal ribs 23, on which the piston 16 travels. Said piston is also channeled for the greater part of its length by longitudinal slits 22, the object of which is to allow the air to pass by way of recesses 46 when the piston is in any position except at the lowest point, when the air is entirely shut off by means of the unslotted portion. This valve is designed to receive its supply of air from any outside source of supply and pressure through pipe 21, and transmits it as modified by the valve through pipes $w$ $w'$ to blow-iron $t$ through air-spindle $s$. Said valve is controlled automatically by means of cam O on shaft 41, which receives motion from main shaft $x$ through worm-gear N and worm L. Said shaft 41 carries also another cam P and a cam trip-arm or striker 42, whose functions have been alluded to and which will presently be described in detail.

M is the electric rheostat by which the electric current which energizes the armature of the prime motor I is timed and controlled and by which the speed of the operation may be measurably regulated. The oscillating radius-arm 6 passes over a series of contact-points $p'$ in connection with graduated resistance-circuits, making successive contact therewith in the well-known way for controlling the amount of current passing to the armature and the speed with which said current is turned on or off, the current being entirely cut off when the radius-arm is at the extreme position to the left. The radius-arm has in its extremity a spring-pressed trip-pin or plunger 8, which is controlled by a bell-crank lever 7 and cord or chain 13, the latter leading over pulley T to piston 26 in retarder 27, which through stem 25 is connected with lever system 2 3 and treadle z, as heretofore stated. The function of this treadle is to start the machinery, which can be done either quickly or slowly, it being sometimes necessary to restrain the normal rapidity of revolution of the rotary parts of the mechanism at the start, as the glass, being highly plastic from intense heat, will sometimes expand too rapidly against the formers under centrifugal action unless the initial speed is carefully regulated. This is done by passing the radius-arm with measured movement over the contact-points of the rheostat, by which precaution the current is only gradually admitted to the armature of the motor. After the current is full on the movements are all automatic until the machine stops by completion of its cycle.

On shaft 41 is a cam-lever arm 42, carrying striker 43, the function of which is to engage the plunger 8 of radius-arm 7 and carry the latter over to its extreme position to the left, whereby the current is shut off from the motor-armature and the machine is automatically stopped. Cam P, also carried on shaft 41, has the function of controlling the lifting and lowering of the bar o, through which the air-spindle s is operated, and simultaneously therewith the rolls k k are opened and closed. This it does by rolling contact with roller R, attached by means of a rigid arm S to bar o. Cam P has a depression Q in its extremity, in which roller R rests after bar o has been lifted, and the motion of the machine ceases.

Figures 5, 6, 7, 8, 9, 10, 11, 12, 13, 14, 15, 16:
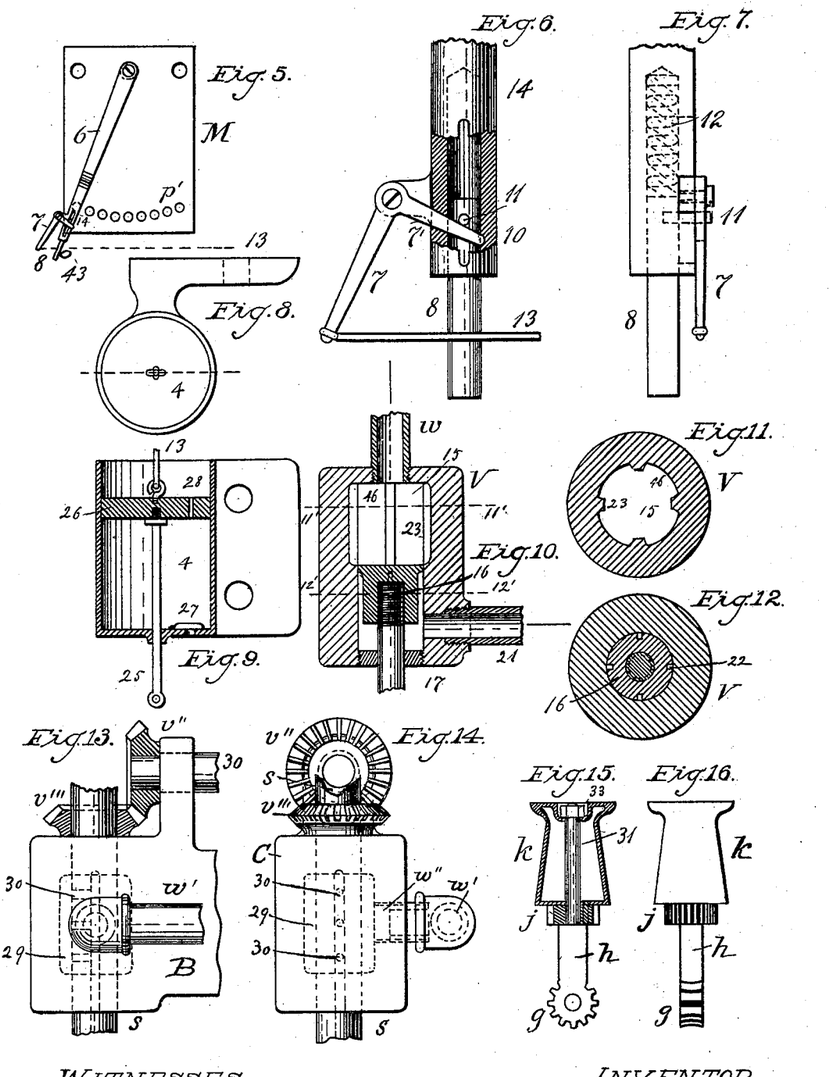
Figure 17:
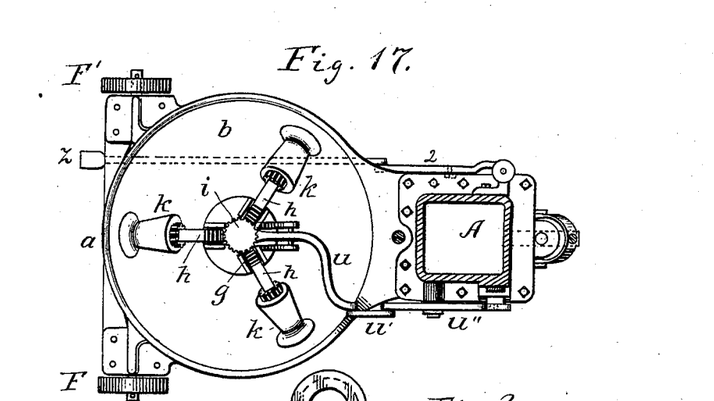
Fig. 17 is a plan view of the base of the machine, showing the rolls thrown apart and resting in the tank before the starting of the machine.

Operation of the machine: Taking the machine when in a state of rest, the forming-rolls are in the expanded position, (shown in Fig. 17,) lying in the water in tank b. The vertical air-spindle s is in elevated position to receive the blow-iron, bar o and treadle z are in their elevated positions, bar o being sustained by its arm S and roller N in notch Q of cam P, and the radius-bar 6 of the rheostat M is at the extreme left, as shown in Fig. 5, stopping the passage of current to the armature of the motor. The attendant having inserted a blow-iron t with a proper gathering of plastic glass suitably manipulated and seated it by its enlargement t' in its socket on arm m', presses the treadle z with his foot, thereby drawing down piston 26 in the retarder 27 and through cord 13 pulling bell-crank retractor 7 on radius-arm 6, thereby retruding plunger 8, so as to pass by striker-pin 43 and carrying radius-arm 6 leisurely over the contact-points of the rheostat, whereby a gradually-increasing current is turned on until said arm comes into the extreme position at the right, as shown in Fig. 1, when the current which supplies the motor-armature will be full on. The resulting movement of the motor-armature starts main shaft x into rotation, through worm J and worm-wheel K, transmitting slow rotary motion through worm L to worm gear N on shaft 41 in the direction indicated by the arrow. This movement speedily releases bar o, hitherto supported by arm S in notch Q of cam P, allowing it to rapidly descend to the position shown in Fig. 1, depressing air-spindle s, causing the latter to engage blow-iron t by means of chuck s' on extremity of spindle s. The rapid descent of bar o has meantime, through compound-lever system u u' u'', depressed the cylindrical rack f on upright shaft e, thereby operating sectors g g and raising radial arms h h, with their formers k k, to the upright position shown in Fig. 1. The said formers thereupon come into contact with the gathering of glass on end of blow-iron t, now in rotation through gears v v' v'' v''' and shaft 30, and the loose pinions j j, having come into engagement with pinion i, borne on shaft e, are, with the formers k k, mounted thereon, also caused to rotate as they come into contact with the rotating plastic mass of glass, shaft e receiving its rotary impulse from shaft x, through gears y y' y'' y''' and shaft H. By a simple change of gearing the plastic glass will be rotated either in the same direction as that of the rolls or in the opposite direction, according to circumstances. The cam O on shaft 41 has meantime gradually let on the air-pressure through air-valve V and pipes w w' w'' and air-box 29, the amount of air required at first being small on account of the extreme plasticity of the hot glass. This air-blast thus gradually expands the gathering of glass into intimate contact with the forming-rolls in conjunction with the centrifugal force of the rotation of the plastic mass, or by the latter alone when the air-blast is not employed. The forming-rolls, in conjunction with the said rotary movement of the expanded glass, now rapidly execute their function of modeling, shaping, and fashioning the exterior of the glass article against the resistance of centrifugal force and the air-pressure within the mass caused by the graduated air-blast of the blow-iron. As said modeling approaches completion the mechanism assumes the position shown in Fig. 1, where cam O has just shut off the air-blast, cam P is just on the point of elevating bar o to its position of rest in notch Q, when air-spindle s will be lifted off of blow-iron t, so that it can be removed, and simultaneously therewith arms h h, with rolls k k, will drop radially outward, dipping said rolls into the water in tank b, releasing the formed article of glass, and cam-lever arm 42, with its striker 43, will have swept arm 6 of the rheostat M over to its extreme position at the left, raising piston 26 in retarder 27 and replacing foot-treadle z and its system of levers 2 3 to their original position. The current will then be cut off from the armature of the motor, which will then cease to actuate main shaft x, and all motions will cease. During this cycle of operations the shaft 41, carrying cams O P and striker-arm 42, is timed to complete exactly one revolution, during which all the requisite movements of the apparatus for forming and completing an article are accomplished. The cycle having thus been automatically completed, the machine is brought to rest in position ready for the next formation, with air-regulating-valve piston in its lowest position, bar o and treadle-lever z in their highest positions, air-spindle s elevated, retarder-piston elevated, radius-arm of the rheostat at the extreme left, held by striker-pin 43, and formers in the water-tank. The round of operations is now ready to begin again, as before, the blow-iron, with its attached article, having been in the meantime removed by the attendant, so that another may be inserted in its place.

I claim and desire to secure by Letters Patent—

1. In a glass-working machine, a plurality of revoluble rolls or formers for operating on plastic glass, means for positively rotating said rolls each on its own axis, and means for rotating a mass of plastic glass in simultaneous contact with said rolls, substantially as specified.

2. In a glass-working machine, a symmetrical group of revoluble rolls or formers, each supported on an axis so as to freely rotate, means for rotating a mass of plastic glass in simultaneous contact with said rolls or formers, and means for automatically expanding and contracting said group concentrically while rotating, substantially as specified.

3. In a glass-working machine, a symmetrical group of revoluble rolls or formers, each borne on a pivoted arm, means for expanding and contracting said group concentrically, means for positively rotating said rolls or formers each on its own axis, and means for rotating a mass of plastic glass in contact with said rolls or formers, substantially as specified.

4. In a glass-working machine, in combination, a water-tank, revoluble rolls or formers mounted concentrically on pivoted arms within said tank, means for rotating said rolls simultaneously, means for rotating a mass of plastic glass in contact with said rolls, and means for withdrawing said rolls simultaneously from contact with the plastic glass, and dipping them in the water in the tank, substantially as specified.

5. In a glass-working machine, a water-tank, a central boss therein, a plurality of pivoted arms mounted concentrically on said boss, rolls or formers mounted revolubly on said pivoted arms, and means for simultaneously lowering said pivoted arms with their rolls from a vertical position so as to dip the rolls in the water in the tank and for raising the same, substantially as specified.

6. In a glass-working machine, a water-tank, a central boss therein, a plurality of pivoted arms mounted concentrically on said boss, rolls or formers mounted revolubly on said pivoted arms, a vertical shaft located centrally in said boss, means for revolving said shaft a pinion on top of said shaft, gears on said revoluble rolls engaging with said pinion, a sleeve d on said shaft, a cylindrical rack f mounted on said sleeve, means for imparting up-and-down motion to said cylindrical rack, and toothed sectors on said pivoted arms, engaging with said cylindrical rack, whereby the said rolls are thrown outward and downward and reversely by the vertical movements imparted to said cylindrical rack, substantially as specified.

7. In a glass-working machine, a water-tank, a group of pivoted arms concentrically mounted in said tank, revoluble rolls or formers mounted on said pivoted arms, gears on said revoluble rolls, an upright revoluble shaft e centrally located with respect to said rolls, a pinion on top of said shaft engaging with gears on said rolls, a removable gathering-iron in alinement with said shaft, a vertically movable and revoluble hollow shaft s having a clutch for engaging said removable gathering-iron, and gears and shafting whereby said vertical hollow shaft s and said upright shaft e receive rotary motion from a common source of motion, substantially as specified.

8. In a glass-working machine, a removable gathering-iron and means for rotating the same, in combination with revoluble rolls or formers, two or more, arranged in a symmetrical group, with means for rotating said rolls each on its own axis, and means for expanding and contracting said group concentrically toward and from said gathering-iron, substantially as specified.

9. In a glass-working machine, a removable blowpipe, means for rotating the same, and means for supplying air to said pipe under pressure, in combination with revoluble rolls or formers, two or more, with means for positively rotating said rolls each on its own axis, and means for automatically expanding and contracting said group concentrically, substantially as specified.

10. In a glass-working machine, in combination, a tank, revoluble rolls or formers mounted centrally therein on pivoted arms, an upright main standard with overhanging arm, a vertical revoluble air-spindle, capable of up-and-down vertical movement, means for supplying air thereto, an electric motor, a rheostat for controlling said motor, an air-pressure regulator, a vertical bar controlling by its movements the positions of the said rovoluble rolls and said air-spindle, a series of cams on a common shaft for automatically controlling the air-supply regulator, the rheostat, and the position of the vertical bar, a treadle connected with the rheostat for starting the machine, and a retarder between the treadle and the rheostat-arm, for preventing a too sudden application of power, substantially as specified.

11. In a glass-working machine, in combination, a revoluble blow-iron supporting a revoluble mass of plastic glass distended with air, revoluble formers, two or more, with means for positively rotating the same in simultaneous contact with said glass, said formers having raised and depressed continuous spiral lines on a portion of their surface, whereby screw-threads may be impressed on a corresponding portion of the plastic glass modeled by the revolution of the formers, substantially as specified.

12. In a glass-working machine, in combination, a revoluble blow-iron supporting a revoluble mass of plastic glass distended with air, revoluble formers, two or more, with means for positively rotating the same in simultaneous contact with said glass, said formers having patterns or letters in raised or depressed lines on their exteriors, whereby the counterpart of said patterns may be impressed upon the plastic glass by the revolution of said formers, substantially as specified.

13. In a glass-working machine, a base, an upright main standard, having an overhanging arm, a vertical bar confined in ways, a vertical hollow shaft or air-spindle borne revolubly on said overhanging arm, means for revolving the same, lever connections between said air-spindle and said vertical bar whereby up-and-down motion is conveyed from the latter to the former, an air-box at the extremity of said overhanging arm surrounding said air-spindle, means for supplying air to said spindle under pressure, perforations in said air-spindle for passing air thereto from said air-box in any position of the spindle, and a clutch on the lower extremity of said air-spindle adapted for engagement with a tubular blow-iron, substantially as specified.

14. In a glass-working machine, a base containing a water-tank, an upright main standard, a vertical bar confined in ways, a vertical revoluble shaft with pinion on top thereof, located centrally in said tank, means for rotating said shaft, a cylindrical rack, loosely borne on said shaft, pivoted arms arranged concentrically around said shaft, having toothed sectors engaging with said cylindrical rack, revoluble rolls or formers borne on said pivoted arms, a mechanical connection between said vertical bar and said cylindrical rack whereby they are caused to rise and fall together, bringing the rolls upright when the bar is depressed and vice versa, and gears on said rolls engaging with pinion on said central shaft, whereby rotary motion is conveyed to said rolls when they assume an upright position, substantially as specified.

15. In a glass-working machine, a base, an upright main standard, a vertical bar supported in ways on said standard, an electric motor, a vertical main shaft deriving rotary motion from said motor, an air-valve for supplying air from an external source in regulated amount or quantity, a rheostat for regulating the current supplied to the motor-armature, a lifting-arm on the vertical bar, and a cam-shaft deriving rotary motion from the vertical main shaft carrying a cam for applying and controlling the air-valve, a cam for lifting and sustaining the vertical bar at the proper intervals, and a cam-lever for automatically shutting off the current from the motor-armature by gradual movement of the rheostat-arm over the contact-points, substantially as specified.

16. In a glass-working machine, in combination, a removable gathering-iron, and means for rotating the same, revoluble formers, two or more, with means for rotating the same in contact with plastic glass borne on said gathering-iron, said formers having shapes adapted to produce articles of prismoidal form with polygonal elliptical or other shaped bases, substantially as specified.

17. In a glass-working machine, in combination, a treadle, a retarder, an electric motor, and a rheostat having radius-arm 6, spring-plunger 8, bell-crank retractor 7, and connection 13 from said retractor to retarder and treadle, whereby the radius-arm is caused to evade the striker-pin 43, and sweep with measured speed over the contact-points of the rheostat and thereby gradually apply the current to the armature of the motor, substantially as specified.

18. The combination of a tank the vertical shaft $e$, means for rotating the same, cylindrical rack $f$, loosely mounted on said shaft, and sleeve $d$, interposed between shaft $e$ and rack $f$, for preventing water from reaching said shaft, substantially as specified.

19. The air-valve V, having chamber 15, with longitudinal recesses 46, separated by ribs 23, in combination with slitted piston 16, push-pin 17, inlet-pipe 21, and outlet-pipe $w$, substantially as specified.

20. The pivoted arm $h$, having toothed sector $g$, axis 31, removable former $k$, and pinion $j$, in combination with cylindrical rack $f$ and pinion $i$, substantially as specified.

21. The combination of tank $b$, having boss $c$, with pivoted arms $h$, removable formers $k$, shaft $e$, cylindrical rack $f$, pinion $i$ and gears $j$, substantially as specified.

22. The group of formers $k$, each positively revoluble on its own axis and revoluble as a group in combination with removable blow-iron $t$, rotatable air-spindle $s$, air-box 29, pipes $w$, $w'$, air-valve V, and means for admitting a graduated supply of air to said air-valve, substantially as specified.

23. The group of formers $k$, in combination with removable blow-iron $t$, rotatable air-spindle $s$, having clutch $s'$, and perforations 30, air-box 29, and air-supply pipe $w'$, substantially as specified.

24. The combination of upright standard A, bracket-arm $m$, bracket-arm $m'$ having seat for blow-iron enlargement, in combination with removable blow-iron $t$, having enlargement $t'$, rotatable and longitudinally-movable air-spindle $s$, having clutch $s'$, and rotary formers $k, k$, each positively revoluble on its own axis and revoluble as a group, substantially as specified.

25. In a glass-working machine, in combination, a group of revoluble rolls or formers, a removable blow-iron, a vertical hollow shaft or air-spindle for supplying air thereto, a clutch on said air-spindle, a means for rotating said air-spindle, a means for vertically lifting and depressing said air-spindle while rotating, a means for supplying air to said air-spindle in regulated amount while rotating, and a means for automatically regulating and stopping said combined movements, substantially as specified.

In testimony whereof I affix my signature in presence of two witnesses.

IRVING W. COLBURN.

Witnesses:
ALEXANDER J. STEUART,
HENRY H. BATES.